United States Patent
Setru et al.

(10) Patent No.: US 10,399,398 B2
(45) Date of Patent: Sep. 3, 2019

(54) UNIDIRECTIONAL SLIDING TOW EYE SYSTEM

(71) Applicant: GM Global Technology Operations LLC, Detroit, MI (US)

(72) Inventors: Prabhushankar J. Setru, Rochester Hills, MI (US); Sajid H. Syed, Troy, MI (US); Ranbirpinder S. Ghag, Windsor (CA); Russel C. Bunger, IV, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 15/660,297

(22) Filed: Jul. 26, 2017

(65) Prior Publication Data

US 2019/0030970 A1    Jan. 31, 2019

(51) Int. Cl.
  *B60D 1/48*    (2006.01)
  *B60D 1/52*    (2006.01)
  *B60D 1/56*    (2006.01)

(52) U.S. Cl.
  CPC .............. *B60D 1/488* (2013.01); *B60D 1/52* (2013.01); *B60D 1/565* (2013.01)

(58) Field of Classification Search
  CPC .................................. B60D 1/488; B60D 1/50
  See application file for complete search history.

(56) References Cited

U.S. PATENT DOCUMENTS

| 6,382,654 | B1 * | 5/2002 | Mahncke | B60D 1/488 280/491.1 |
| 6,893,063 | B2 * | 5/2005 | Harrison | B60D 1/485 293/117 |
| 7,137,658 | B2 * | 11/2006 | Haneda | B60D 1/56 293/117 |
| 7,758,060 | B2 * | 7/2010 | Lopez | B60D 1/488 280/495 |
| 8,328,223 | B2 * | 12/2012 | Leinenger | B60D 1/04 280/416.1 |
| 8,590,950 | B2 * | 11/2013 | Hermanson | B60D 1/565 293/102 |
| 8,678,423 | B1 * | 3/2014 | Hwang | B60R 19/34 280/495 |
| 10,131,193 | B2 * | 11/2018 | Degenkolb | B60D 1/488 |

FOREIGN PATENT DOCUMENTS

| DE | 102018001611 A1 * | 8/2018 | ............. B60D 1/565 |
| JP | 2003002136 A * | 1/2003 | ............. B60D 1/243 |

\* cited by examiner

*Primary Examiner* — Kevin Hurley
(74) *Attorney, Agent, or Firm* — Cantor Colburn LLP

(57) ABSTRACT

A motor vehicle frame includes a tow eye receiver bracket receiving recess. A mechanical fastener extends into the tow eye receiver bracket receiving recess. A tow eye receiver bracket is arranged in the tow eye receiver bracket receiving recess. The tow eye receiver bracket includes a base member, a first side member extending outwardly from the base member and a second side member extending outwardly from the base member forming a substantially C-shaped cross-section. At least one of the first and second side members and the base member includes a decoupling feature engageable with the mechanical fastener. The decoupling feature prevents movement of the tow eye receiver bracket outwardly of the frame member and enables movement of the tow eye receiver bracket into the frame member.

14 Claims, 4 Drawing Sheets

UNIDIRECTIONAL SLIDING TOW EYE SYSTEM

The subject disclosure relates to the art of motor vehicles and, more particularly, to a unidirectional sliding tow eye support bracket for a motor vehicle.

Many motor vehicles include a chassis frame or motor compartment rails that support one or more tow eyes. The tow eyes are typically accessible externally of the vehicle. The tow eyes provide a convenient attachment point that may be used for towing purposes and as a vehicle tie down point during vehicle transport. The tow eyes, which thread into a tow eye receiver, are typically cantilevered off of a front of the chassis frame or motor compartment rail.

The tow eye receiver is located in a front chassis frame or a motor compartment rail and is typically non-deformable. Therefore, tow eye receivers may reduce an ability of the vehicle to absorb impact energy in a frontal crash event. This may result in increased passenger compartment intrusion and may also influence vehicle sensing system components that control passenger restraints during an impact.

Motor vehicle chassis frames or motor compartment rails are designed to respond to crash loading in a particular manner. Specifically, the chassis frames or motor compartment rails are designed to crush in such a way as to absorb and distribute, as much as possible, crash loading away from occupant spaces of the vehicle. Frames are also designed to yield in such a way so as to move engine and drive train components away from occupant spaces. Deformations of the chassis frame or motor compartment rails caused by the tow eyes may alter load distribution through the frame. Accordingly, it is desirable to provide a system that allows crash loads to be applied directly to the frame.

SUMMARY

In accordance with an aspect of an exemplary embodiment, a motor vehicle frame includes a frame member having a forward end provided with a tow eye receiver bracket receiving recess. The forward end includes a base surface, a first side surface and a second side surface. At least one of the base surface, and the first and second side surfaces includes at least one opening. A mechanical fastener extends through the at least one opening into the tow eye receiver bracket receiving recess. A tow eye receiver bracket is arranged in the tow eye receiver bracket receiving recess. The tow eye receiver bracket includes a base member, a first side member extending outwardly from the base member and a second side member extending outwardly from the base member forming a substantially C-shaped cross-section. At least one of the first and second side members and the base member includes a decoupling feature engageable with the mechanical fastener. The decoupling feature prevents movement of the tow eye receiver bracket outwardly of the frame member and enables movement of the tow eye receiver bracket into the frame member.

In addition to one or more of the features described above or below, or as an alternative, further embodiments could include wherein the decoupling feature comprises a slotted opening formed in one of the first side surface and the second side surface.

In addition to one or more of the features described above or below, or as an alternative, further embodiments could include wherein the slotted opening is defined by an edge having a discontinuity.

In addition to one or more of the features described above or below, or as an alternative, further embodiments could include wherein the slotted opening includes a forwardly facing end portion and a rearwardly facing end portion, the discontinuity being arranged at the forwardly facing end portion.

In addition to one or more of the features described above or below, or as an alternative, further embodiments could include wherein the mechanical fastener includes a clinch nut having a first surface portion and a stepped surface portion, the stepped surface portion extending into the slotted opening.

In addition to one or more of the features described above or below, or as an alternative, further embodiments could include wherein the at least one opening includes a substantially circular shape.

In addition to one or more of the features described above or below, or as an alternative, further embodiments could include wherein the at least one opening includes a first opening and a second opening, the first opening including a substantially circular shape and the second opening includes a keyhole shape.

In addition to one or more of the features described above or below, or as an alternative, further embodiments could include wherein the tow eye receiver bracket includes an opening that registers with the second opening, another mechanical fastener extends through the second opening into the opening in the tow eye receiver bracket.

In addition to one or more of the features described above or below, or as an alternative, further embodiments could include a tow eye receiver block arranged in the tow eye receiver bracket, the tow eye receiver block including a tow eye receiving portion.

In addition to one or more of the features described above or below, or as an alternative, further embodiments could include wherein the another mechanical fastener passes through the tow eye receiver block.

In addition to one or more of the features described above or below, or as an alternative, further embodiments could include a tow eye detachably connected with the tow eye receiver block.

In accordance with another exemplary aspect of an exemplary embodiment, a method of distributing forces in a vehicle frame having a frame member including a frame member axis, the method includes exposing a tow eye receiver bracket mounted to the vehicle frame to a force along the frame member axis; and shifting a tow eye receiver bracket along the frame member axis.

In addition to one or more of the features described above or below, or as an alternative, further embodiments could include wherein shifting the tow eye receiver bracket includes sliding a slotted opening of the tow eye receiver bracket relative to a mechanical fastener extending through the vehicle frame.

In addition to one or more of the features described above or below, or as an alternative, further embodiments could include wherein shifting the tow eye receiver bracket includes sliding the tow eye receiver bracket into the vehicle frame.

In addition to one or more of the features described above or below, or as an alternative, further embodiments could include wherein shifting the tow eye receiver bracket includes sliding the tow eye receiver bracket without imparting a force to the vehicle frame that is substantially angled relative to the frame member axis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
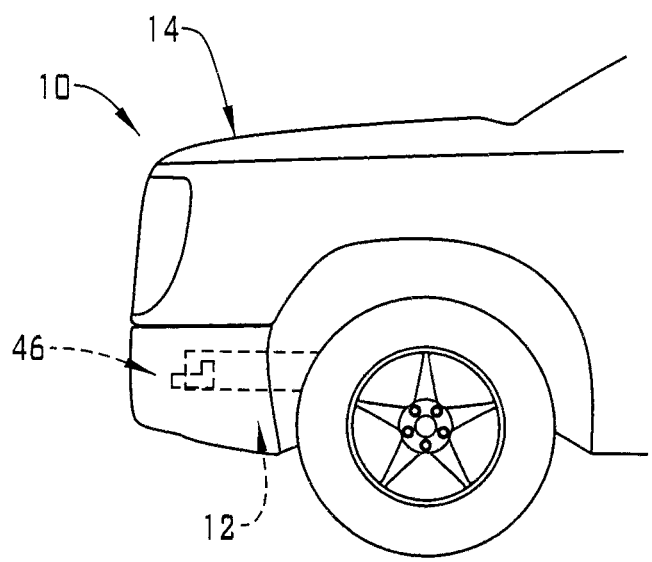
FIG. 1 depicts a front end of a vehicle including a unidirectional sliding tow eye system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

Figure 2:
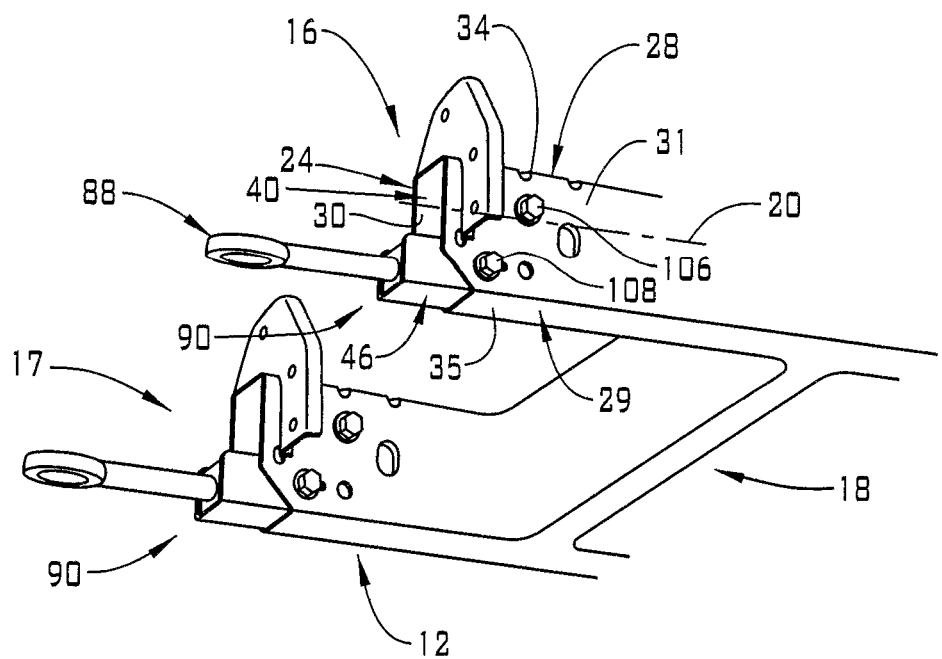
FIG. 2 depicts a vehicle frame of the vehicle of FIG. 1, including a unidirectional sliding tow eye system, in accordance with an exemplary embodiment.

A vehicle, in accordance with an exemplary embodiment, is indicted generally at 10 in FIG. 1. Vehicle 10 includes a vehicle frame 12 that supports a body 14. Vehicle frame 12 may include a first frame member 16 and a second frame member 17 as shown in FIG. 2. Vehicle frame 12 may also include a number of cross members, one of which is shown at 18 that extend laterally between first frame member 16 and second frame members 17. The term vehicle frame should be understood to include chassis frame components and motor compartment rails as well as other structural components of vehicle 10.

Figure 3:
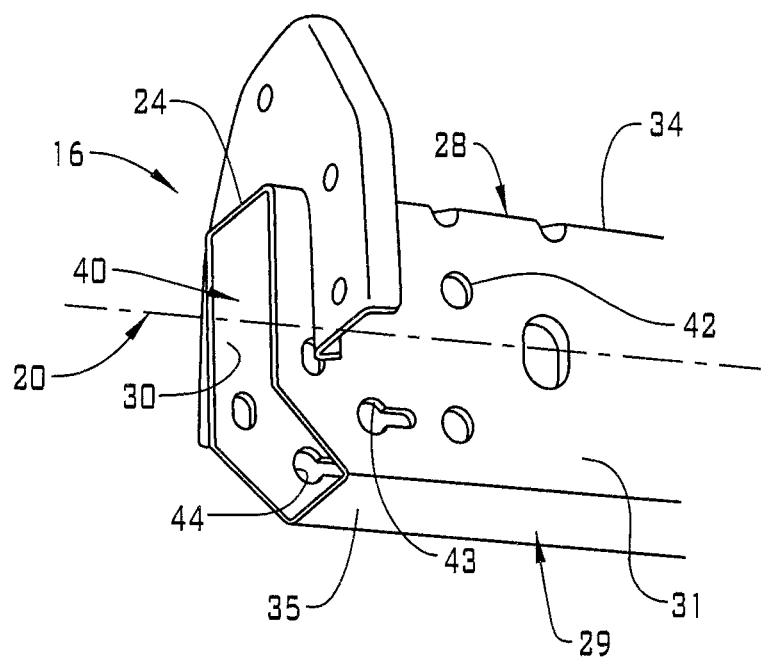
FIG. 3 depicts a frame member, in accordance with an aspect of an exemplary embodiment.

With reference to FIG. 3, and continued reference to FIGS. 1 and 2, a detailed description will follow with respect to first frame member 16 with an understanding that second frame member 17 may include similar structure. First frame member 16 extends along a frame member axis 20 and includes a forward end 24. Forward end 24 includes a first side surface 28, a second side surface 29, a third side surface 30 and a fourth side surface 31. In accordance with an exemplary aspect, first side surface 28 may define a top or upper surface 34 and second side surface 29 may define a lower or base surface 35.

First, second, third and fourth side surfaces 28-31 collectively define a tow eye receiver bracket receiving recess 40. Further, third side surface 30 includes a first opening 42, and a second opening 43. Fourth side surface 31 includes a third opening 44. In accordance with an exemplary aspect, first opening 42 is substantially circular while second and third openings 43 and 44 may include a keyhole shape. A tow eye receiver bracket 46 is received by tow eye receiver bracket receiving recess 40.

Figure 4:
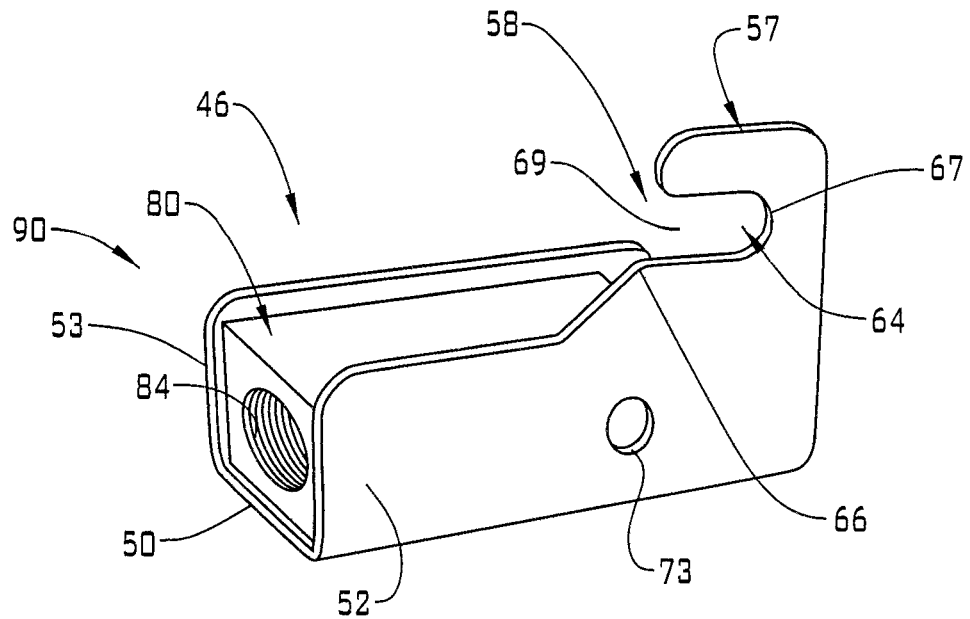
FIG. 4 depicts a tow eye receiver bracket, in accordance with an aspect of an exemplary embodiment.

In accordance with an exemplary aspect, Tow eye receiver bracket 46 forms part of a unidirectional sliding tow eye system. Referring to FIG. 4, and with continued reference to FIGS. 1-3, tow eye receiver bracket 46 may include a base member 50, a first side member 52 and a second side member 53 defining a generally C-shaped cross-section. Tow eye receiver bracket 46 includes a tab element 57 extending from first side member 52. Tab element 57 includes a decoupling feature 58 which, as will be detailed herein, decouples tow eye receiver bracket 46 from first frame member 16 during a frontal impact to vehicle 10.

Decoupling feature 58 may be defined by a slotted opening 64 having a forwardly facing end portion 66 and a rearwardly facing end portion 67. Forwardly facing end portion 66 includes a discontinuity 69, which as will be described herein, facilitates rearward shifting of tow eye receiver bracket 46. Tow eye receiver bracket 46 includes an opening 73 and supports a tow eye receiver block 80. Tow eye receiver block 80 includes a tow eye receiving portion 82 defined by a threaded opening 84 that is selectively receptive of a tow eye 88 (FIG. 2).

Figure 5:
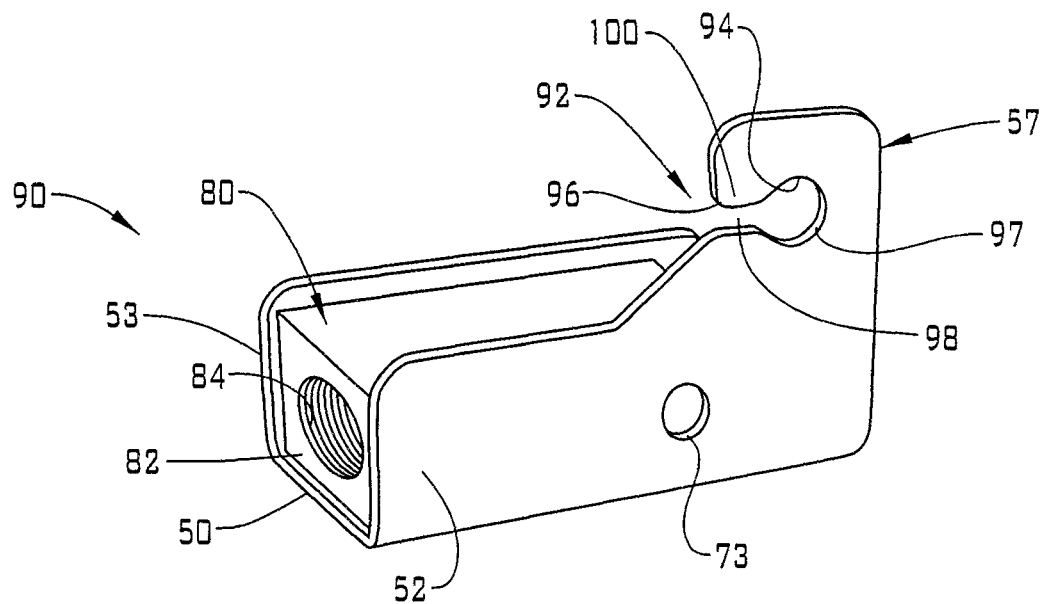
FIG. 5 depicts a tow eye receiver bracket, in accordance with another aspect of an exemplary embodiment.

Reference will now follow to FIG. 5, wherein like reference numbers represent corresponding parts in the respective views in describing a tow eye receiver bracket 90 in accordance with another aspect of an exemplary embodiment. Tow eye receiver bracket 90 may include a decoupling feature 92 defined by a slotted opening 94. Slotted opening 94 includes a forwardly facing end portion 96 and a rearwardly facing end portion 97. Forwardly facing end portion 96 includes a discontinuity 98 that facilitates rearward shifting of tow eye receiver bracket 46 when vehicle frame 12 is exposed to a frontal impact. Slotted opening 94 includes a reduced width portion 100 at discontinuity 98. Reduced width portion 100 promotes retaining of tow eye receiver bracket 46 without impairing shifting.

With continued reference to FIGS. 1-4, tow eye receiver bracket 46 is secured in forward end 24 of first frame member 16 through a first mechanical fastener 106 and a second mechanical fastener 108. First mechanical fastener 106 extends through first opening 42 and decoupling feature 58. As will be detailed herein, tow eye receiver bracket 46 may translate over first mechanical fastener 106. Second mechanical fastener 108 extends through second and third openings 43 and 44 and through tow eye receiver block 80.

Figure 6:
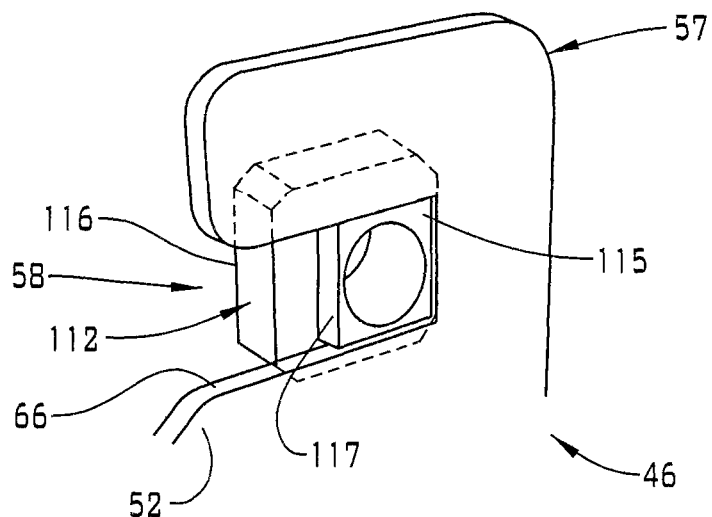
FIG. 6 depicts a view of a portion of the tow eye receiver bracket of FIG. 3.
Figure 7:
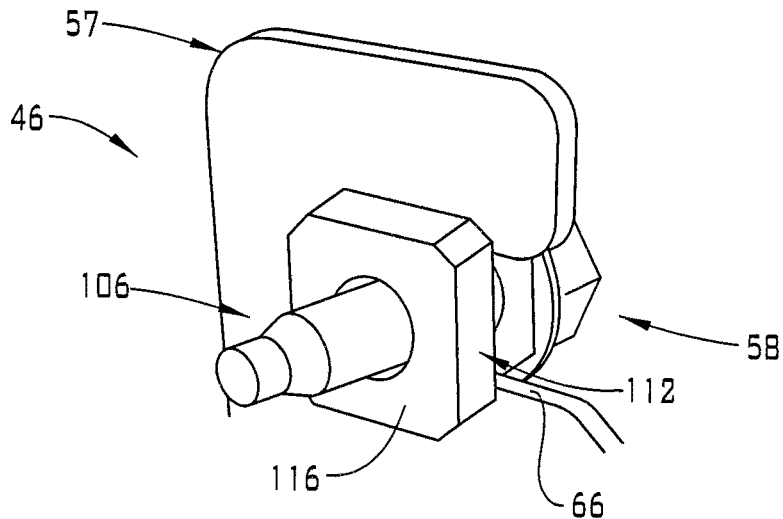
FIG. 7 depicts a view of another portion of the tow eye receiver bracket of FIG. 3.
Figure 8:
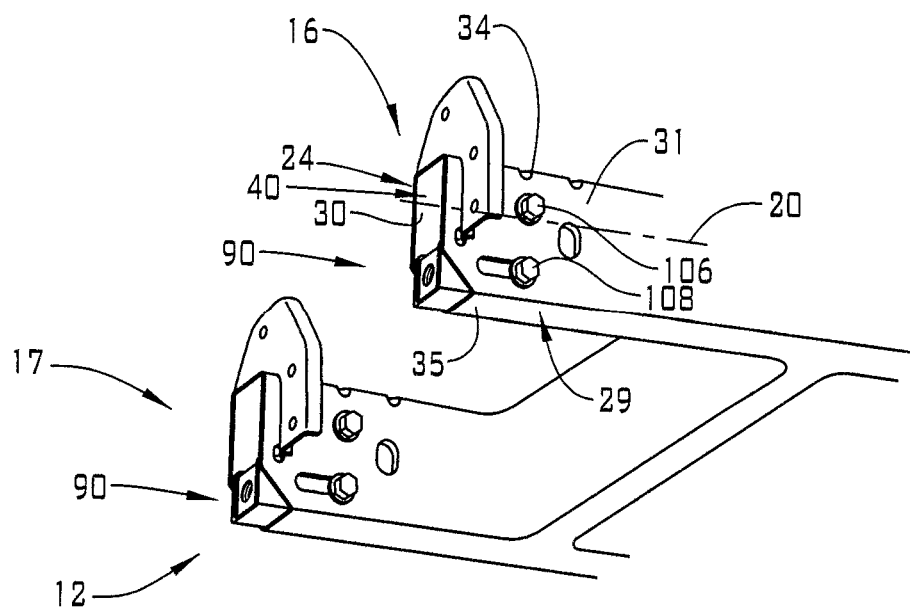
FIG. 8 depicts tow eye receiver brackets shifted into corresponding frame members, in accordance with an aspect of an exemplary embodiment.

With reference to FIGS. 6 and 7 and continued reference to FIGS. 1-4, first mechanical fastener 106 is operatively connected to a clinch nut 112. Clinch nut 112 includes a first surface portion 116, a second surface portion 115 and a stepped surface portion 117. First surface portion 116 secures tab element 57 to side surface 30 while stepped surface portion 117 enables second surface portion 115 to nest within decoupling feature 58. It should be understood that clinch nut 112 may take on a variety of forms depending upon vehicle architecture and need not be limited to the exemplary embodiments shown. As an example, slotted opening 94 may employ a clinch nut, not shown, having a circular stepped surface portion. In this manner, tow eye receiver bracket 46 may withstand and support towing forces, tie down forces and the like. However, upon being exposed to a frontal impact, tow eye receiver bracket 46 may shift into first frame member 16 as shown in FIG. 8.

Second mechanical fastener 108 secures tow eye receiver block 80 in tow eye receiver bracket 46 and to first frame member 16. Second mechanical fastener 108 may shift along second and third openings 43 and 44 allowing tow eye receiver bracket 46 to slide into first frame member 16 in a manner discussed above. During shifting, second and third openings may expand due to a force applied to, for example, fastener 108. Further, shifting of tow eye receiver bracket may cause a failure of, or a tearing in, third and fourth side surfaces 30 and 31. It should be understood that by allowing tow eye receiver bracket 46 to shift, frontal impact forces will remain substantially along frame member axis 20. That is, tow eye receiver bracket 46 may slide allowing third frame side surface 30 and fourth frame side surface 31 to yield without imparting angular forces on first frame member 16. In this manner, vehicle frame 12 may collapse and absorb impact forces in a selected failure mode.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A motor vehicle frame comprising:
    a frame member including a forward end having a tow eye receiver bracket receiving recess, the forward end including a base surface, a first side surface and a second side surface, at least one of the base surface, and the first and second side surfaces including at least one opening;
    a mechanical fastener extending through the at least one opening into the tow eye receiver bracket receiving recess; and
    a tow eye receiver bracket arranged in the tow eye receiver bracket receiving recess, the tow eye receiver bracket including a base member, a first side member extending outwardly from the base member and a second side member extending outwardly from the base member forming a substantially C-shaped cross-section, at least one of the first and second side members and the base member including a decoupling feature engageable with the mechanical fastener, the decoupling feature preventing movement of the tow eye receiver bracket outwardly of the frame member and enabling movement of the tow eye receiver bracket into the frame member.

2. The motor vehicle frame according to claim 1, wherein the decoupling feature comprises a slotted opening formed in one of the first side surface and the second side surface.

3. The motor vehicle frame according to claim 2, wherein the slotted opening is defined by an edge having a discontinuity.

4. The motor vehicle frame according to claim 3, wherein the slotted opening includes a forwardly facing end portion and a rearwardly facing end portion, the discontinuity being arranged at the forwardly facing end portion.

5. The motor vehicle frame according to claim 2, wherein the mechanical fastener includes a clinch nut having a first surface portion and a stepped surface portion, the stepped surface portion extending into the slotted opening.

6. The motor vehicle frame according to claim 1, wherein the at least one opening includes a substantially circular shape.

7. The motor vehicle frame according to claim 1, wherein the at least one opening includes a first opening and a second opening, the first opening including a substantially circular shape and the second opening includes a keyhole shape.

8. The motor vehicle frame according to claim 7, wherein the tow eye receiver bracket includes an opening that registers with the second opening, another mechanical fastener extends through the second opening into the opening in the tow eye receiver bracket.

9. The motor vehicle frame according to claim 8, further comprising: a tow eye receiver block arranged in the tow eye receiver bracket, the tow eye receiver block including a tow eye receiving portion.

10. The motor vehicle frame according to claim 9, wherein the another mechanical fastener passes through the tow eye receiver block.

11. The motor vehicle frame according to claim 9, further comprising: a tow eye detachably connected with the tow eye receiver block.

12. A method of distributing forces in a vehicle frame having a frame member including a frame member axis, the method comprising:
    exposing a tow eye receiver bracket mounted to the vehicle frame to a force along the frame member axis; and
    shifting a tow eye receiver bracket along the frame member axis by sliding a slotted opening of the tow eye receiver bracket relative to a mechanical fastener extending through the vehicle frame.

13. The method of claim 12, wherein shifting the tow eye receiver bracket includes sliding the tow eye receiver bracket into the vehicle frame.

14. The method of claim 12, wherein shifting the tow eye receiver bracket includes sliding the tow eye receiver bracket without imparting a force to the vehicle frame that is substantially angled relative to the frame member axis.

* * * * *